United States Patent [19]
Unterberger et al.

[11] Patent Number: 5,993,896
[45] Date of Patent: Nov. 30, 1999

[54] METHOD AND APPARATUS FOR ENVELOPING ELECTRICAL AND/OR OPTICAL CONDUCTORS WITH A RESIN

[75] Inventors: Siegfried Unterberger, Coburg; Frederic Zapf, Neustadt, both of Germany

[73] Assignee: Siemens Aktiengesellschaft, Munich, Germany

[21] Appl. No.: 08/898,116

[22] Filed: Jul. 22, 1997

[30] Foreign Application Priority Data

Aug. 7, 1996 [DE] Germany .......................... 196 31 908

[51] Int. Cl.$^6$ .............................. B05D 5/12; B05D 5/06; B05B 5/00
[52] U.S. Cl. ..................... 427/117; 118/420; 118/641; 427/163.2; 427/118; 427/500; 427/501; 427/498; 427/388.1; 427/385.5; 427/389.7; 42/513; 42/514; 42/469; 42/407.2
[58] Field of Search .................. 427/163.2, 500, 427/501, 514, 512, 498, 513, 117, 118, 385.5, 388.1, 389.7, 409, 407.2; 118/420, 641

[56] References Cited

U.S. PATENT DOCUMENTS

| | | | |
|---|---|---|---|
| Re. 33,677 | 8/1991 | Vazirani | 427/163.2 |
| 4,125,644 | 11/1978 | Ketley et al. | 427/163.2 |
| 4,479,984 | 10/1984 | Levy et al. | 427/163.2 |
| 4,480,898 | 11/1984 | Taylor | 427/163.2 |
| 4,575,437 | 3/1986 | Kojima et al. | 427/163.2 |
| 4,647,474 | 3/1987 | Masuda et al. | 427/500 |
| 4,849,640 | 7/1989 | Kruishoop | 250/492.1 |
| 5,024,507 | 6/1991 | Minns et al. | 427/163.2 |
| 5,042,907 | 8/1991 | Bell et al. | 427/163.2 |
| 5,139,816 | 8/1992 | Eckberg | 427/163.2 |
| 5,352,712 | 10/1994 | Shustack | 427/163.2 |
| 5,416,880 | 5/1995 | Edwards et al. | 427/163.2 |
| 5,536,529 | 7/1996 | Shustack | 427/163.2 |
| 5,593,736 | 1/1997 | Cowen et al. | 427/163.2 |
| 5,596,669 | 1/1997 | Murphy et al. | 427/163.2 |
| 5,636,307 | 6/1997 | Cowen et al. | 427/163.2 |
| 5,639,846 | 6/1997 | Shustack | 427/163.2 |

FOREIGN PATENT DOCUMENTS

| | | |
|---|---|---|
| 0 588 038 | 3/1994 | European Pat. Off. . |
| 296 21 982 | 4/1997 | Germany . |
| 1087536 | 3/1989 | Japan . |
| 9110479 | 4/1997 | Japan . |
| 2 155 357 | 9/1985 | United Kingdom . |

*Primary Examiner*—Janyce Bell
*Attorney, Agent, or Firm*—Hill & Simpson

[57] ABSTRACT

When enveloping an electrical or an optical conductor, the method applies a radiation-reactive resin having photoinitiators with an absorption maximum onto the conductor and then the resin is cured by subjecting it to a radiation of a wavelength preferably in the wavelength range for the absorption maximum of the photoinitiators. The apparatus for enveloping includes an arrangement for applying the resin followed by a radiation source for applying the radiation of the desired wavelength that falls into the range of the absorption maximum of the photoinitiators of the resin.

22 Claims, 1 Drawing Sheet

METHOD AND APPARATUS FOR ENVELOPING ELECTRICAL AND/OR OPTICAL CONDUCTORS WITH A RESIN

BACKGROUND OF THE INVENTION

The present invention is directed to a method for enveloping an electrical or optical conductor with a radiation-reactive resin that is applied onto the conductor and subsequently subjected to a radiation for hardening and to the apparatus for performing the method.

Electrical conductors and optical conductors are provided with coatings that are produced of a plastic material and serve for insulation and/or protection. Resins, for example radiation-curable resins, such as UV-curable resins, are often employed for these coatings. The radiation required for the curing process only partially effects the triggering of the actual hardening process. A great part of the radiation energy also leads to an unnecessary heating of the substrate which is being coated. This heating will result in unfavorable energy balance and, particularly given very sensitive conductors, is undesirable in some instances because other component parts of the conductor can be damaged or deteriorated.

SUMMARY OF THE INVENTION

The object of the present invention is to provide a method for curing the coating in an especially effective and gentle way. The method to obtain this object is to provide a coating of a resin having photoinitiators, said photoinitiators having an absorption maximum, and applying a radiation which has a wavelength which lies in the wavelength range of the absorption maximum of the photoinitiator.

As a result of the selective selection of the radiation whose wavelength is directed to the absorption maximum of the photoinitiator of the resin to the farthest-reaching extent, the major part of the energy of the radiation is used practically only for the initiation event. The energy balance can thus be improved, and the temperature applied in the hardening is also lower in many instances than given traditional methods. The stressing of potentially sensitive component parts of the conductors can thus be kept low.

What are referred to as "excimer lamps" are preferably employed as the radiation sources. These lamps are especially high-energy and, due to their specific active principle, enable a defined monochromatic wavelength to be generated and emitted. For example, a wavelength of 308 nm is emitted by a lamp which excites xenon/chlorine gas. By exciting a KrCl gas in a lamp, a radiation wavelength of 222 nm is obtained. By exciting xenon gas in a lamp, a 172 nm radiation is obtained. Details of such excimer radiations sources are well known and are, for example, set forth in European Published Application 0 588 038.

The invention is also directed to an apparatus for enveloping an electrical and/or optical conductor by utilizing a radiation-reactive resin, wherein a radiation source is provided for the radiation curing of the resin. The improvements are that the radiation of the radiation source comprises a wavelength that preferably lies in the wavelength range in which the absorption maximum for the photoinitiator of the resin lies.

Other advantages and features of the invention will be readily apparent from the following description of the preferred embodiments, the drawings and claims.

DESCRIPTION OF THE PREFERRED EMBODIMENTS

Figure 1:
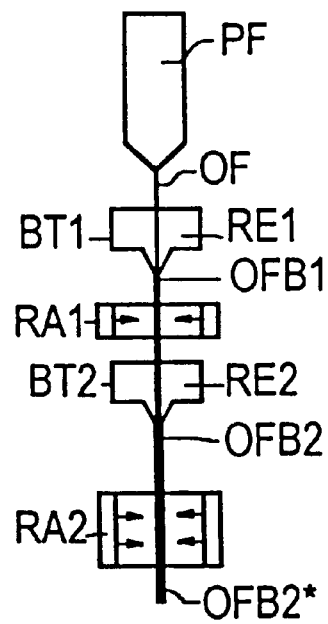
FIG. 1 is a schematic illustration of an arrangement for manufacturing a light waveguide in accordance with the present invention.

The principles of the present invention are particularly useful when incorporated in a device schematically illustrated in FIG. 1. The arrangement in FIG. 1 includes means for producing an optical waveguide by drawing an optical fiber OF from a preform PF. The preform PF is heated by appropriate means and a thin light waveguide fiber OF is vertically drawn from the preform PF and through a first coating means or arrangement BT1, which can have the form of a coating nozzle. The coating means BT1 contains a resin RE1 that will cure when charged with radiation. The epoxy resins or acrylic resins mentioned hereinbelow can be employed for this resin. After the uniform coating of the optical fiber OF, the hardening resin RE1 is applied as a primary coating that is subsequently charged with a radiation by a radiation source RA1 that initiates and accelerates the curing process. The wavelength of the radiation employed here is preferably monochromatic, preferably lies in the UV range and is selected so that the wavelength of the radiation preferably lies in the wavelength range in which the absorption maximum for the photoinitiator of the resin RE1 lies.

For example, the following resins can preferably be employed:

| Resin | Photoinitiator | Wavelength (nm) |
|---|---|---|
| urethane acrylates with polymeric and/or oligomeric main chain | IRGACURE 907 2-methyl-1-[4-(methyltio)-phenyl]-2-N-morpholino-propanone-1 | 308 |
| acrylic esters with polymeric and/or oligomeric main chain on the basis of polyether, polyester, polycarbonate reactive dilutants | IRGACURE 500 1:1 mixture of 1-hydroxy-cyclohexyl-phenyketone and benzophenone | 330 |
| silicon acrylates with polymeric and/or oligomeric main chain | CPTX 1-chlor-4-propoxy-thio-xanthone | 380 |
| polybutadiene acrylates with polymeric and/or oligomeric main chain | IRGACURE 184 1-hydroxy-cyclo-hexyl-phenylketone | 222 |
| epoxy acrylates with polymeric and/or oligomeric main chain | diphenyliodoniumhexa-fluoro-phosphate | 380 |

IRGACURE is a trademark of Ciba-Geigy and CPTX is a trademark of Shell.

The resins are essentially composed of the above-mentioned substances and can also potentially contain these in the form of a mixture. Additives in the form selected from a group consisting of monofunctional dilutants, polyfunctional dilutants and mixtures of monofunctional and polyfunctional dilutants can be provided.

Commercially-available photoinitiators with extinction maximums in the wavelength range of from 200 nm to 400 nm can be advantageously added to the resin. The photoinitiator is expediently added to the radiation-reactive resin in weight proportions from 0.1 to 20%, and preferably in a range of 1to 10%. The photoinitiator is advantageously composed of a commercially-available, cationically-initiating photoinitiators which are preferably selected from a group consisting of diaryliodonium salt and triarylsulfonium salt.

Preferably, the energy of radiation source RA1 is essentially employed only for the activation of the photoinitiators so that an increase in the temperature of the coated optical conductor OFB1 can be kept to a minimum.

In many instances, a two-layer protective envelope is applied on the optical fiber OF. In the present case, an additional or second coating means BT2 is therefore provided, and this functions as a coating nozzle or as an extruder and an additional or second resin RE2 curing under radiation is contained therein. The double-coated light waveguide OFB2 obtained in this manner also passes through a second or additional radiation source RA2, wherein the wavelength of this source is selected so that it lies in the wavelength range in which the absorption maximum of the photoinitiators of the resin RE2 lies. At the end, a light waveguide OFB2* is obtained that has a double coating and that can be manufactured reliably at high fabrication speeds and with little increase in temperature.

It is also possible to have only one of the coating apparatus, for example BT1, work with radiation-curable resin and the other coating apparatus BT2 only with another material, for example a thermoelastic material.

It is also possible without further ado to provide only the coating, in particular an outer coating, such as produced with the resin RE2, with a color additive in order to obtain a colored light waveguide. Finally, it is also possible to utilize the invention not only when drawing the fibers themselves, but also for a subsequent coating, for example for a color application to a finished light waveguide.

Figure 2:
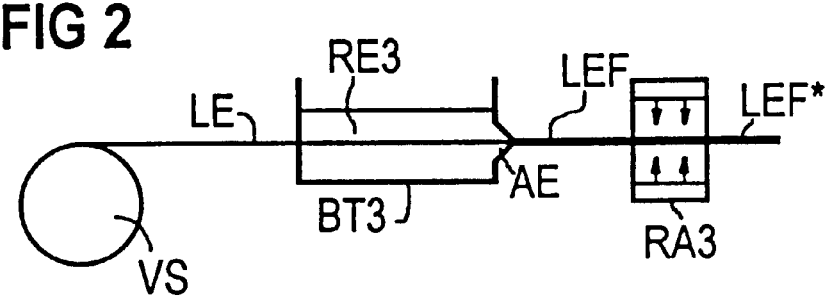
FIG. 2 is a schematic presentation for applying a resin coating with pigments on a conductor in accordance with the present invention.

In FIG. 2, a conductor LE is wound on a supply reel VS. This conductor LE can be composed of a bare, electrically-conductive wire; however, it is also possible to employ an insulated electrical conductor or a coated light waveguide. The invention can also be applied to air-spaced, paper-insulated, tightly wrapped cores of, for example, structures having a plurality of light waveguides, such as, for example, for the manufacture of optical ribbon conductors of the like. Preferably, a colored resin RE3 should be applied as the first or additional layer. This is shown as being contained in an immersion bath BT3, through which the conductor LE is passed horizontally. A stripper nozzle AE determines the thickness of the coating to be centrally applied and is provided at the outlet of the bath BT3. The conductor LEF coated with the resin RE3 in this way is supplied to a radiation source RA3 whose wavelength is selected so that it lies in the wavelength range in which the absorption maximum of the photoinitiator contained in the resin RE3 lies.

Figure 3:
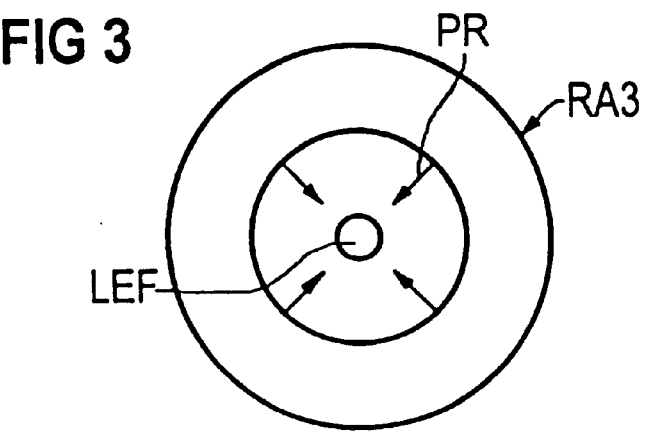
FIG. 3 is an end view of a radiation source employed in the apparatus of the present invention.

In an end view illustrated in FIG. 3, the radiation source for generating a specific wavelength or a narrow wavelength range is shown. This is therefore preferably a matter of what is referred to as an "excimer", for example an arrangement that generates essentially one radiation having a very defined wavelength. The respective conductor, for example the conductor LEF according to FIG. 2, passes through the radiation source RA3 centrally, whereby the radiation acts radially on the conductor LEF from all sides, as indicated by the arrows PR. The exterior structure of the radiation source RA3 is cylindrically fashioned and, thus, generates the desired radiation on all sides and, thus, the desire effective curing of the coating material in the form of the resin, for example the resin RE3.

Although the method of FIG. 2 is using a single conductor, the method can also be implemented so that the conductors are fashioned in the form of a plurality of electrical or optical conductors and so that the resin, as applied, serves the purpose of connecting these conductors to one another for the purpose of forming a bundle of conductors, for example a ribbon conductor.

Although various minor modifications may be suggested by those versed in the art, it should be understood that we wish to embody within the scope of the patent granted hereon all such modifications as reasonably and properly come within the scope of our contribution to the art.

We claim:

1. A method for enveloping a conductor with a radiation-reactive resin, said method comprising the steps of providing the conductor, applying a radiation-reactive resin onto the conductor, said resin containing a photoinitiator having an absorption maximum, and subjecting the coated conductor to a monochromatic radiation of a wavelength lying in the wavelength range of the absorption maximum of the photoinitiator to cure the resin with a minimum temperature increase.

2. A method according to claim 1, wherein the resin is a colored resin.

3. A method according to claim 1, wherein the resin is applied onto an optical waveguide as a primary coating.

4. A method according to claim 3, which includes applying a second coating of a radiation-reactive resin with a photoinitiator on the first cured coating and subjecting the second coating to a monochromatic radiation of a wavelength lying in the wavelength range of the absorption maximum of the photoinitiator of the second resin to cause curing of the second coating with a minimum temperature increase.

5. A method according to claim 1, wherein the step of subjecting the coated conductor to a monochromatic radiation applies the radiation onto the conductor from all sides.

6. A method according to claim 1, wherein the monochromatic radiation is produced from an excimer lamp.

7. A method according to claim 1, wherein a source for the monochromatic radiation has a circular symmetry and the conductor is conducted through the radiation source concentric therewith.

8. A method according to claim 1, wherein a plurality of electrical conductors are brought side-by-side and are coated with the resin so that the resin, when cured, will connect the conductors together.

9. A method according to claim 1, wherein the step of applying a radiation-reactive resin provides a urethane acrylate with a main chain selected from a group consisting of polymeric main chains, oligomeric main chains and mixtures of polymeric and oligomeric main chains.

10. A method according to claim 1, wherein the step of applying a radiation-reactive resin provides an acrylic ester with a main chain selected from a group consisting of polymeric main chains, oligomeric main chains and mixtures of polymeric and oligomeric main chains.

11. A method according to claim 10, wherein the main chains are selected from a group consisting of polyether, polyester and polycarbonate.

12. A method according to claim 1, wherein the step of applying a radiation-reactive resin provides a resin containing silicon acrylate with a main chain selected from a group consisting of polymeric main chains, oligomeric main chains and mixtures of polymeric and oligomeric main chains.

13. A method according to claim 1, wherein the step of applying a radiation-reactive resin provides a resin containing polybutadiene acrylate with a main chain selected from a group of polymeric main chains, oligomeric main chains and mixtures of polymeric and oligomeric main chains.

14. A method according to claim 1, wherein the step of applying a radiation-reactive resin provides a resin containing epoxy acrylate with a main chain selected from a group of polymeric main chains, oligomeric main chains and mixtures of polymeric and oligomeric main chains.

15. A method according to claim 1, wherein the step of applying a radiation-reactive resin provides a resin containing an additive selected from a group consisting of monofunctional unsaturated reactive dilutants, polyfunctional unsaturated reactive dilutants and mixtures of monofunctional and polyfunctional unsaturated reactive dilutants.

16. A method according to claim 1, wherein the step of providing a radiation-reactive resin provides a resin containing photoinitiators with extinction maximums in the wavelength range of 200 nm to 400 nm said monochromatic radiation being created by a lamp containing a gas selected from a group consisting of Xenon, a mixture of Xenon and Chlorine, and a mixture of Krypton and Chlorine.

17. A method according to claim 16, wherein the step of applying a radiation-reactive resin provided a resin containing a photoinitiator in a weight proportion of 0.1 to 20%.

18. A method according to claim 14, wherein the range of weight proportions is 1 to 10%.

19. A method according to claim 1, wherein the step of applying a radiation-reactive resin provides a resin containing a photoinitiator in a weight proportion of 0.1 to 20%.

20. A method according to claim 19, wherein the range of weight proportions is 1 to 10%.

21. A method according to claim 1, wherein the photoinitiators are cationically initiating photoinitiators selected from a group consisting of diaryliodonium salts and triarylsulfonium salts.

22. An apparatus for enveloping a conductor with a radiation-reactive resin, said apparatus comprising providing means for applying a radiation-reactive resin having a photoinitiator onto the conductor and providing a radiation source for monochromatic radiation-curing the resin on said conductor, said monochromatic radiation source having a wavelength lying in the wavelength range for the absorption maximum of the photoinitiators of the resin.

* * * * *